(12) United States Patent
Flugrad et al.

(10) Patent No.: US 8,534,146 B2
(45) Date of Patent: Sep. 17, 2013

(54) GEARED, CONTINUOUSLY VARIABLE SPEED TRANSMISSION

(75) Inventors: Donald R. Flugrad, Ames, IA (US);
Abir Z. Qamhiyah, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 483 days.

(21) Appl. No.: 12/851,670

(22) Filed: Aug. 6, 2010

(65) Prior Publication Data
US 2010/0294054 A1 Nov. 25, 2010

Related U.S. Application Data

(63) Continuation-in-part of application No. 11/828,621, filed on Jul. 26, 2007, now Pat. No. 7,938,033.

(60) Provisional application No. 60/820,354, filed on Jul. 26, 2006.

(51) Int. Cl.
*F16H 3/02* (2006.01)
(52) U.S. Cl.
USPC ............. 74/29; 74/110; 74/130; 74/422
(58) Field of Classification Search
USPC ............ 74/29, 30, 46, 110, 111, 120, 130, 74/131, 422
See application file for complete search history.

(56) References Cited

U.S. PATENT DOCUMENTS

| | | | |
|---|---|---|---|
| 2,870,644 A * | 1/1959 | Winter | 74/351 |
| 4,817,464 A | 4/1989 | Korban et al. | |
| 4,850,248 A | 7/1989 | Korban et al. | |
| 2004/0014548 A1 * | 1/2004 | Borbolla Gonzalez | 475/214 |

* cited by examiner

*Primary Examiner* — William C Joyce
(74) *Attorney, Agent, or Firm* — McKee, Voorhees & Sease, P.L.C.

(57) ABSTRACT

A continuously variable speed transmission includes a first guideway, a second guideway, wherein the first guideway and the second guideway remain stationary during operation at a particular speed ratio. The transmission includes a first member moveably connected to the first guideway and the second guideway, the first member includes gear teeth and a second member having gear teeth positioned at an adjustable angle relative to the first member. The speed ratio of the transmission is determined based on angle of the second member relative to the first member. In another variation, the first member may be either an input member or a control member, and the second member may be either an input member or a control member. An additional member connected to the center of the gear between the first and second members would then serve as the output member.

24 Claims, 8 Drawing Sheets

GEARED, CONTINUOUSLY VARIABLE SPEED TRANSMISSION

CROSS-REFERENCE TO RELATED APPLICATIONS

This application is a continuation-in-part of co-pending, commonly assigned, U.S. Ser. No. 11/828,621 filed Jul. 26, 2007, which claims priority under 35 U.S.C. §119 to provisional application Ser. No. 60/820,354 filed Jul. 26, 2006, herein incorporated by reference in their entirety.

BACKGROUND OF THE INVENTION

Most cars today use transmissions that provide three or four specific speed ratios. A continuously variable speed transmission can make the car run more efficiently, saving fuel costs. Thus, in some instances continuously variable speed transmissions have been used which incorporate variable speed belt drives and toroidal continuously variable speed transmissions. However, problems remain with such designs.

In a typical belt driven continuously variable speed transmission much efficiency is lost due to slippage. In such systems where friction is used to transmit power, rubber v-belts may slip resulting in losses. What is needed is a design for a continuously variable speed transmission which avoids the loss of efficiency due to slippage associated with conventional variable speed transmission designs.

BRIEF SUMMARY OF THE INVENTION

Therefore, it is a primary object, feature, or advantage of the present invention to improve over the state of the art.

It is a further object, feature, or advantage of the present invention to provide continuously variable speeds using gears rather than friction elements.

A still further object, feature, or advantage of the present invention is to reduce the losses associated with slippage.

Another object, feature, or advantage of the present invention is to provide continuously variable speed transmission able to handle higher loads in a smaller package than conventional belt-driven systems.

Yet another object, feature, or advantage of the present invention is to provide a transmission which operates more efficiently than three or four speed transmissions commonly used in automotive vehicles.

One or more of these and/or other objects, features, or advantages of the present invention will become apparent from the specification and claims that follow.

The present invention provides continuously variable speeds using gears rather than friction elements. Thus, higher loads can be handled than with traction drive systems of the same size. Automotive engines that use this device would operate more efficiently compared to three or four speed transmissions. Since there is no possible slip from the gear teeth there would be no losses due to slip. The only losses would be from pumping oil to keep the system lubricated, inertia losses, and from friction.

According to one aspect of the present invention, a continuously variable speed transmission includes a first guideway and a second guideway. The first guideway and the second guideway remain stationary during operation of the transmission at a particular speed ratio. There is a first member moveably connected to the first guideway and the second guideway. The first member has gear teeth. A second member having gear teeth is positioned at an adjustable angle relative to the first member. There is a gear engagingly connected to the gear teeth of the first member and the gear teeth of the second member. The speed ratio of the transmission is determined based on angle of the second member relative to the first member. The angle is adjustable over a range, such as between 0 and 90 degrees. The first member may be an input or an output and the second member may be an output or an input depending upon whether a speed increase or a speed decrease is desired. Both the first guideway and the second guideway may include a slot and the first member may have two protrusions, a first of the protrusions fitting within the first guideway and a second of the protrusions fitting within the second guideway. Preferably the gear is a spur gear although a helical gear may be used. Also various means may be used for rotating the second member including a twin-lead screw assembly operatively connected to the second member to rotate the second member. On the output side there may be multiple gears configured to produce output motion rotating continuously in one direction. Alternatively a slider crank or Scotch yoke may be used for converting linear, reciprocating motion of the output member into rotary motion.

According to another aspect of the present invention, a geared continuously variable speed transmission includes a first rack reciprocating in a vertical direction, a second and third rack constrained to transmit motion in only the horizontal direction, and a gear engagingly connected to the first rack and the second and third rack. An angle of the second rack relative to the input rack is adjustable over a range to thereby achieve an infinite number of speed ratios. Preferably the range is 0 to 90 degrees.

DETAILED DESCRIPTION OF THE PREFERRED EMBODIMENT

Figure 1A:
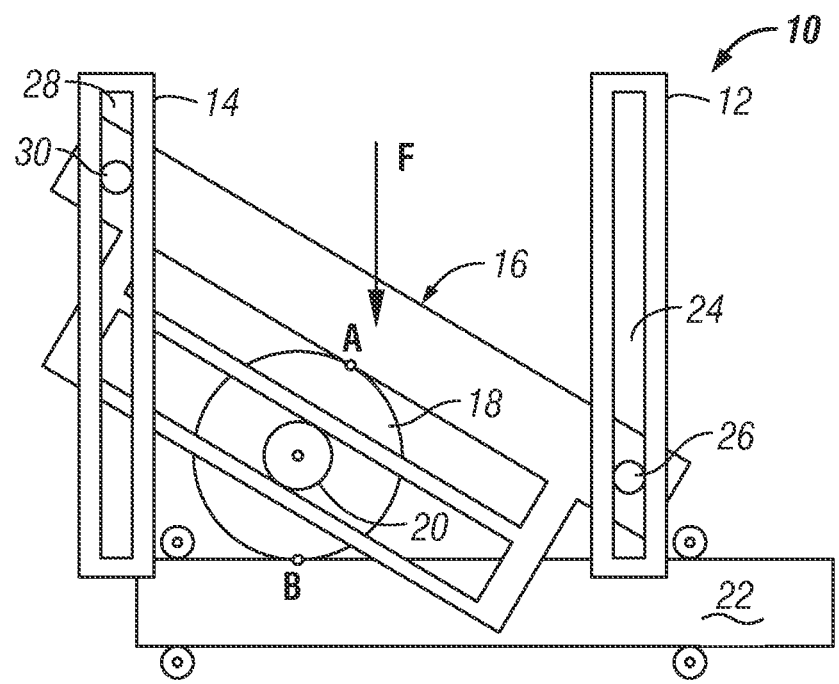
FIG. 1A is a front view of the transmission in one orientation.

FIG. 1A illustrates one configuration of the continuously variable speed transmission of the present invention. The transmission uses gears instead of traction drive elements. It also operates as an impulse drive type of transmission where the input member oscillates back and forth with motion transmitted to the output member only while the input member is moving in one direction. When the input member reverses and moves back to its starting point, the output member continues to move in the same direction due either to inertia or to forces exerted by similar systems operating out of phase with the system shown.

FIG. 1A illustrates two guideways 12, 14 which remain stationary during operation at a particular speed ratio. A first member 16 has two round protrusions 26, 30 that fit into the slots 24, 28 of the vertical guideways 12, 14. The first member 16 can be considered an input member or an output member. As shown in FIG. 1A, the first member 16 is considered to be an input member as the force, F, moves the first member 16 up and down at a prescribed input speed. The first member 16 has gear teeth that mesh with the teeth of gear 18, and gear 18 also meshes with gear teeth on the second member 22. As shown in FIG. 1A, the second member is considered to be an output member. It is to be understood, however that the first member can be either an input member or an output member and the second member 22 can be either an output member or an input member depending upon whether a speed increase or a speed decrease is desired.

Figure 1B:
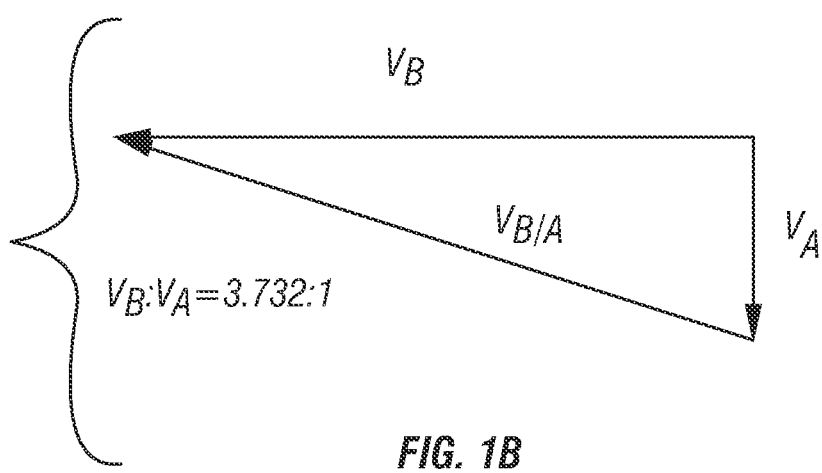
FIG. 1B illustrates a velocity diagram corresponding with the transmission shown in FIG. 1A.

As the first member 16 moves downward, it causes gear 18 to rotate clockwise and translate to the left. This motion causes the second member 22 to move to the left. The velocity analysis for the system is shown by the velocity polygon of FIG. 1B. Suppose the first member 16 is moving downward at a velocity shown by $V_A$ in the velocity polygon. Then the second member 22 will move to the left with a velocity given by $V_B$. As shown in the velocity polygon of FIG. 1B, the speed ratio of the second member 22 to the first member 16 is 3.732:1. That is, the second member 22 will move to the left at a speed that is 3.732 times the downward speed of the first member 16.

Figure 2A:
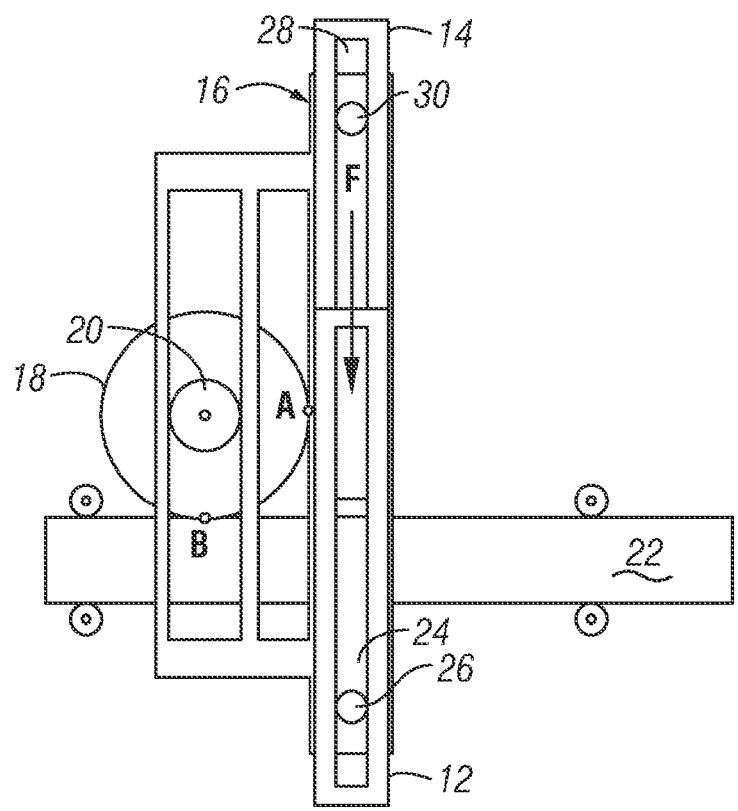
FIG. 2A is a front view of the transmission in a second orientation.
Figure 2B:
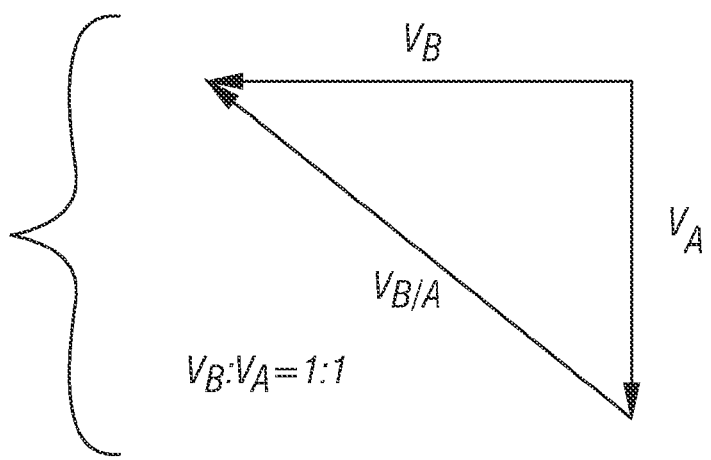
FIG. 2B illustrates a velocity diagram corresponding with the transmission shown in FIG. 2A.

If the vertical guideways are then moved toward each other until they are aligned as shown in FIG. 2A, the speed ratio will change. The gear teeth on member 16 now contact gear 18 at a different point. When the first member 16 moves downward, gear 18 will rotate in a clockwise direction, but its center will remain stationary. The velocity polygon of FIG. 2B provides the same velocity for $V_A$ as provided in FIG. 2A. Comparing velocity for the second member 22 in FIGS. 1A and 1B to FIGS. 2A and 2B, clearly shows that the velocity for the second member 22 is much smaller in FIGS. 2A and 2B. In fact, the velocity ratio is 1:1 as shown in FIG. 2B.

Figure 3A:
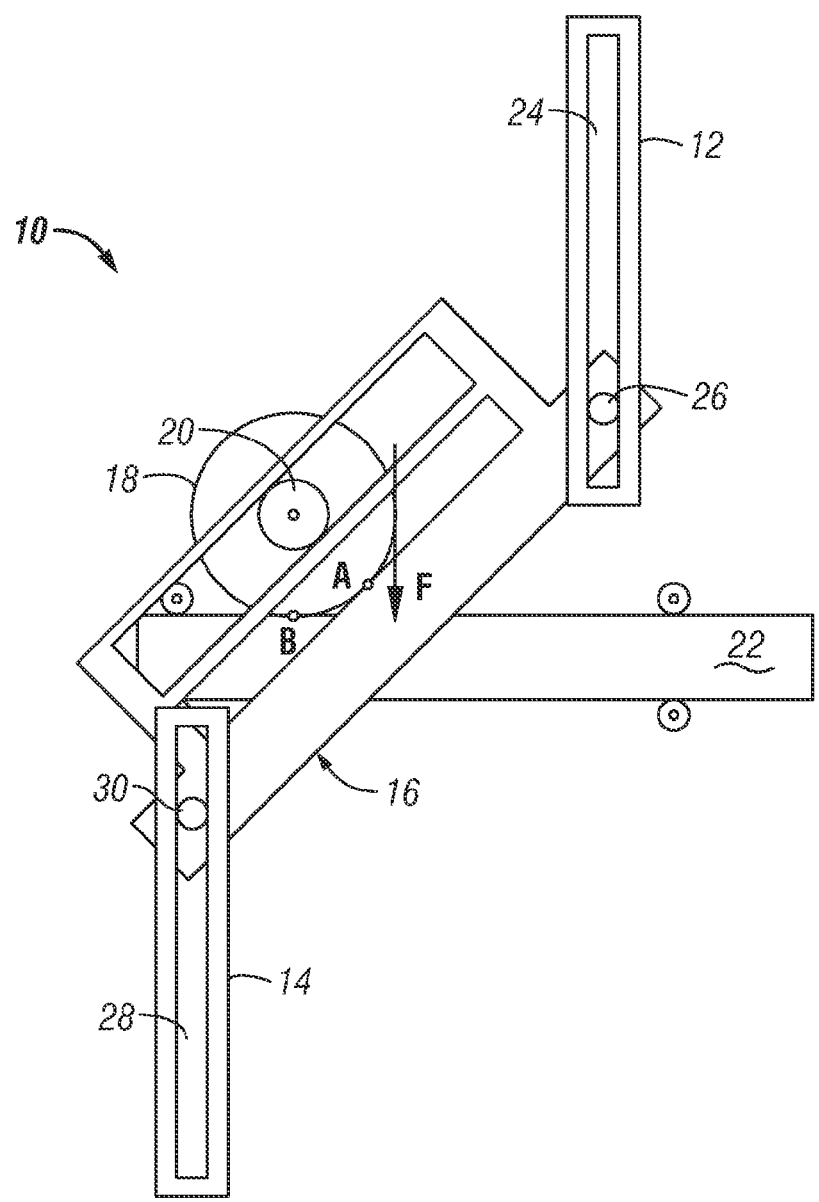
FIG. 3A is a front view of the transmission in a third orientation.
Figure 3B:
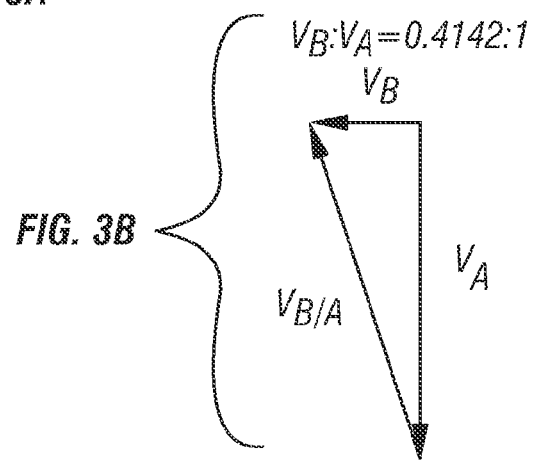
FIG. 3B illustrates a velocity diagram corresponding with the transmission shown in FIG. 3A.

If the guideways are moved even further so the first member 16 is oriented as shown in FIG. 3A, the speed ratio changes even more. For the same input velocity the velocity polygon shows that $V_B$ is quite small. As the first member 16 moves downward, gear 18 still rotates clockwise, but it also translates to the right. The resulting speed ratio is 0.4142:1. That is, the second member 22 will move to the left with a speed that is 0.4142 times the downward speed of the first member 16.

Figure 4:
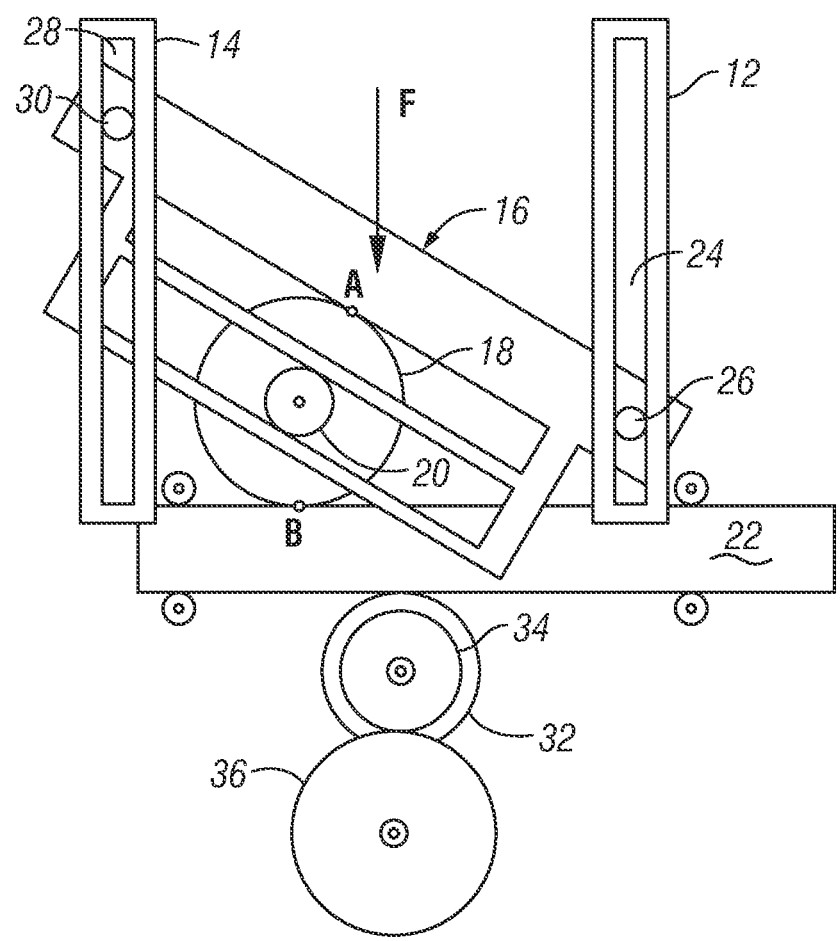
FIG. 4 is a front view of one embodiment of the transmission.

For each of the embodiments shown in FIG. 1A-1B, FIG. 2A-2B, and FIG. 3A-3B, the first member 16 will eventually stop and then move upward in preparation for the next stroke. During the upward motion, gear 18 and the second member 22 will reverse their direction and return to their initial positions also. FIG. 4 shows how this oscillatory operation might be used to produce output motion that rotates continuously in one direction. There are three new gears 32, 34, 36 shown in FIG. 4. Gear 36 is the ultimate output member for the system. As the second member 22 moves to the left due to input from the first member 16, it will cause gear 32 to rotate counterclockwise. There is a one-way clutch (not shown) positioned between gear 32 and gear 34. When gear 32 rotates counterclockwise, it will drive gear 34 in a counterclockwise direction. This motion will cause output gear 36 to rotate in a clockwise direction. Because of the one-way clutch, gear 32 will not drive gear 34 as members 16, 18, and 22 reverse direction to return to their starting position. Gear 36 will be free to continue its clockwise motion due either to inertia or to forces from similar systems acting out of phase with the system shown.

For example, the set of parts shown in FIG. 1A could be duplicated for each piston of an internal combustion engine. As the pistons of the engine translate, they drive members such as 16 downward, producing clockwise motion of the output member 36. Since the pistons move out of phase with each other, they will take turns providing motion to the output member, which will move continuously in a clockwise direction. Of course, other input sources could be used rather than an internal combustion engine. For example, the input could be provided by an electric motor driving a cam which would impart input motion to several systems similar to that in FIG. 1A in a sequential fashion to produce continuous output motion.

Figure 5:
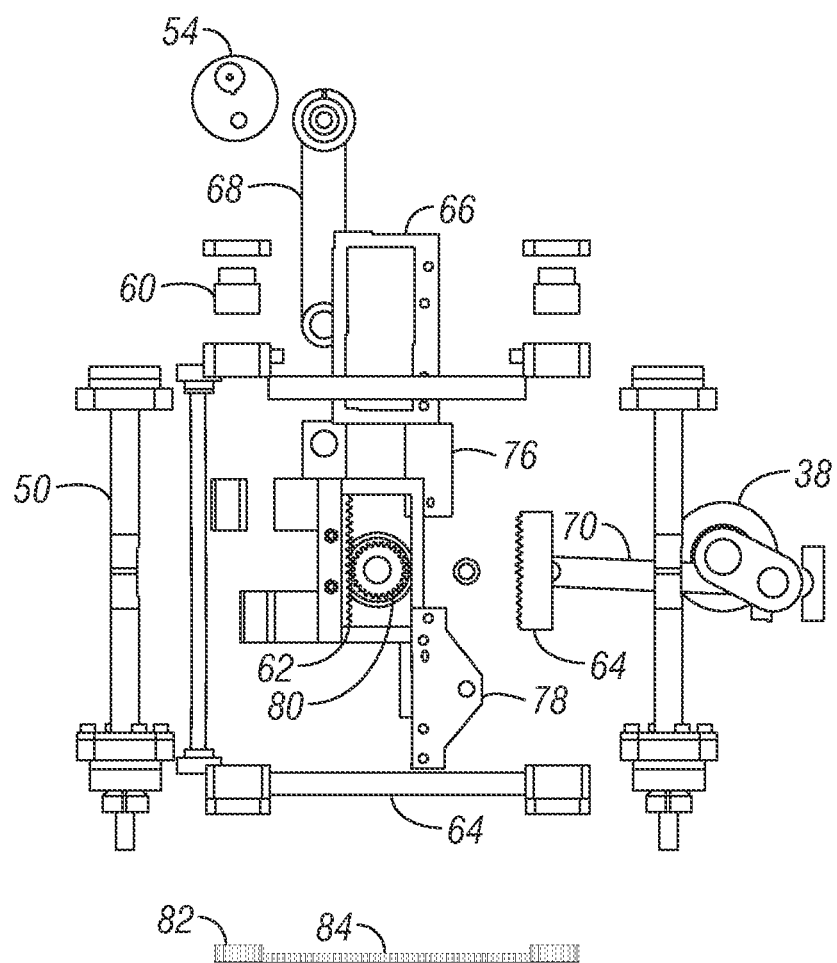
FIG. 5 is an exploded side view of one embodiment of a geared continuously variable transmission.
Figure 6:
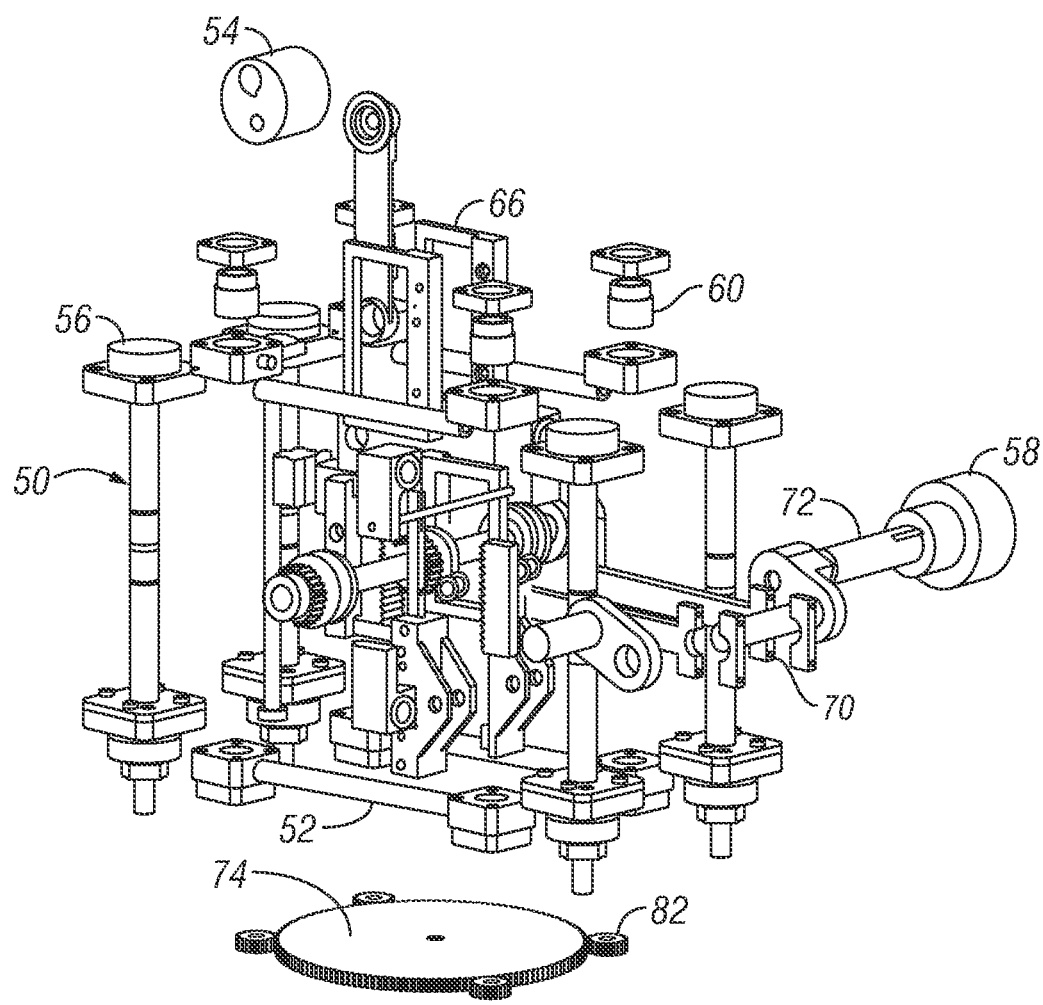
FIG. 6 is an exploded isometric view of the geared continuously variable transmission shown in FIG. 5.

FIG. 5 is an exploded side view of one embodiment of a geared CVT assembly. FIG. 6 is an exploded isometric view of such a geared CVT assembly. The CVT assembly shown in FIG. 5 and FIG. 6 illustrate one embodiment of the present invention as implemented to transmit power from the engine to the drive axle and wheels of a mini-Baja car. The present invention is not to be limited merely to this particular embodiment or the specific design considerations and parameters used in this particular embodiment. One skilled in the art having the benefit of this disclosure will appreciate that a geared continuously variable transmission of the present invention has numerous uses in any number of vehicle or equipment applications, each of which may require or suggest different design considerations or design parameters.

A twin-lead screw assembly 50 is used in order to change the gear ratio. The twin-lead screw assembly 50 includes four twin lead screws to provide consistent, repeatable actuation. In order to assure that all four screws are turned the same amount, five gears with a diametral pitch of 16 were used. Four 24 tooth gears were used at the end of each twin lead screw. A 192 tooth gear is mounted in the center with a push pull cable and a spring attached to it. When the larger gear is turned it causes the smaller gears to turn equal amounts. Linear shafting 52 and an input hub 54 are shown. The linear shafting 52 is supported by linear shafting supports 56. A one way clutch 58 is also provided. Bronze nuts 60 are used for fastening the assembly 50. An input rack 62 reciprocates in only the vertical direction, and it turns the gear 80. When the gear 80 turns, the gear 80 forces the output rack 64 in the horizontal direction. A constraining member holds the output rack 64 in the vertical direction. The gear ratio is determined by the angle that the output rack 64 makes with the input rack 62. Rack shoulders 66 keep the gears from crushing each other. An input crank arm 68 is used to convert rotary motion into reciprocating motion. An output connecting rod 70 operatively connects the output shafting 72 to the output rack 64. The output shafting 72 is also operatively connected to the one way clutch 58. Output shafting 72 provides for rotational motion using a slider crank mechanism to convert reciprocating back into rotational motion. In order to keep the sprocket rotating in just one direction a clutch was needed to transmit the power when the output crank was applying a counterclockwise rotation. One example of such a one way clutch 58 is the Formsprag model FSO 500 one way clutch which has a high torque capacity and high indexing rates. The Formsprag clutch also has a slightly larger moment of inertia allowing the clutch to also operate as a flywheel, and thus smoothing the power output of the system. A 12 inch 192 tooth spur gear 74 is shown. Linear bearings 76 are used in order to allow for free movement in the horizontal direction. An output rack housing 78 constrains the output rack in the vertical direction while allowing them to move freely in the horizontal direction. A two inch 20 tooth spur gear 16 is shown as well as a 1.5 inch 24 tooth spur gear 82. The spur gears were used in place of helical gears so simple supports could be used to constrain the system in the axial horizontal direction. A lubrication system may be used with appropriate design criteria based on the travel rate of the gears and racks.

Figure 7:
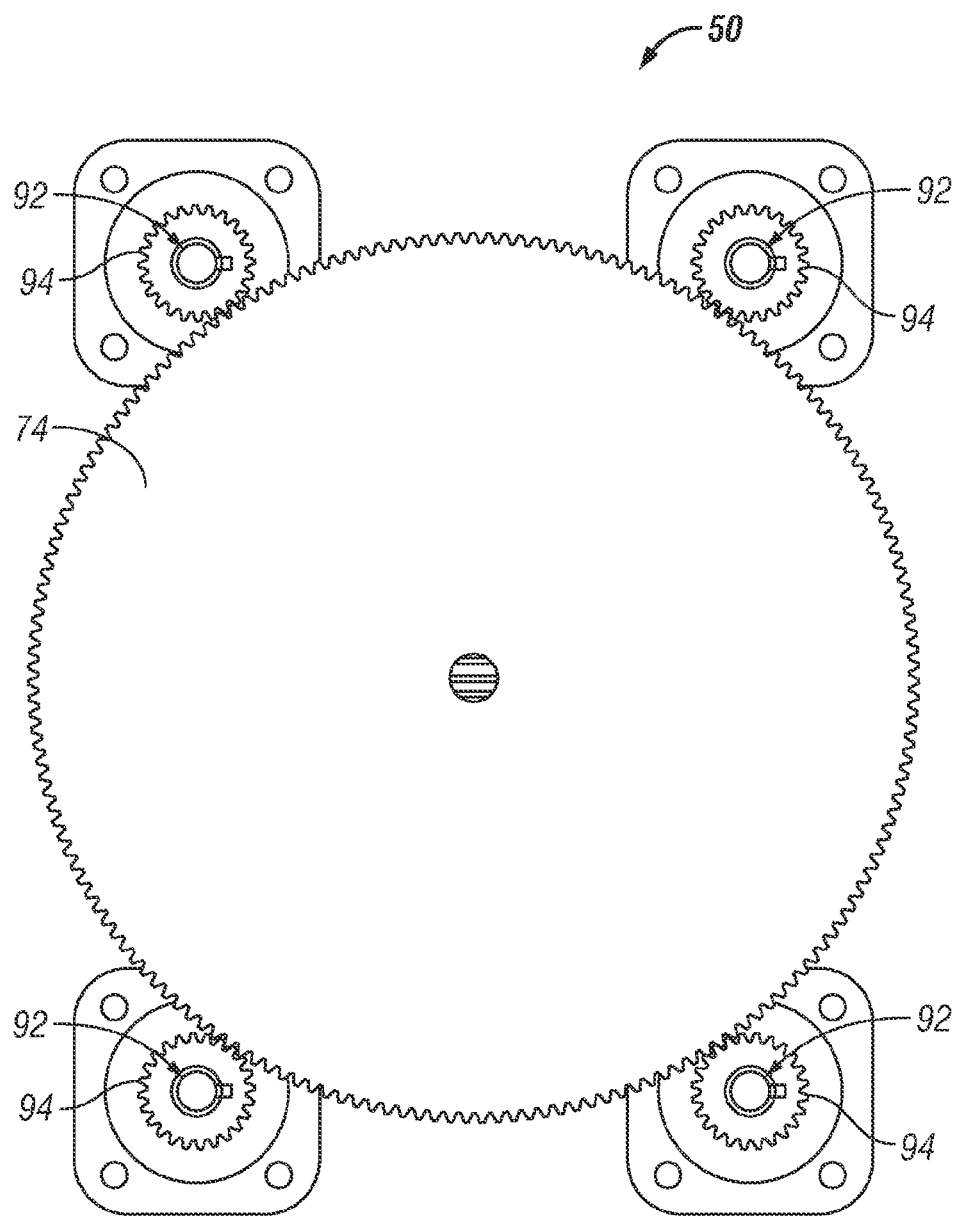
FIG. 7 is a top view illustrating the twin lead screw assembly for changing the gear ratio.

FIG. 7 is a top view of the twin screw assembly 50 which is used to change the gear ratio. The larger spur gear 74 is shown which engages four smaller gears 94, each of the smaller gears 94 associated with one of the twin lead screws 92. A push-pull cable, not shown, may be attached to and used to rotate the larger center spur gear 74, thereby causing the four twin-lead screws 92 to rotate synchronously.

The design shown in FIG. 5 through FIG. 7 is merely one embodiment of the present invention. Numerous variations and alternative embodiments are contemplated. For example, reciprocating action may be taken straight from an engine's piston. This results in a simpler design and removes the need for the slider crank mechanism shown for the input. Similarly, a slider crank mechanism need not be used on the output shaft if reciprocating motion as opposed to rotational movement is desired. Where rotary motion is desired, instead of a slider crank mechanism, a Scotch yoke or other mechanism may be used.

Alternatively, instead of spur gears, helical gears may be used. Spur gears are generally preferably because there is a wider selection of standardized spur gears than helical gears, helical gears are more expensive, and spur racks are generally easier to machine and therefore less expensive than helical racks. However, helical gears may be preferable in a specific application or specific designs.

Alternatively, the first and second guideways 12 and 14 could be replaced by a single guideway and a linkage to control the orientation of the first member 16.

Figure 8:
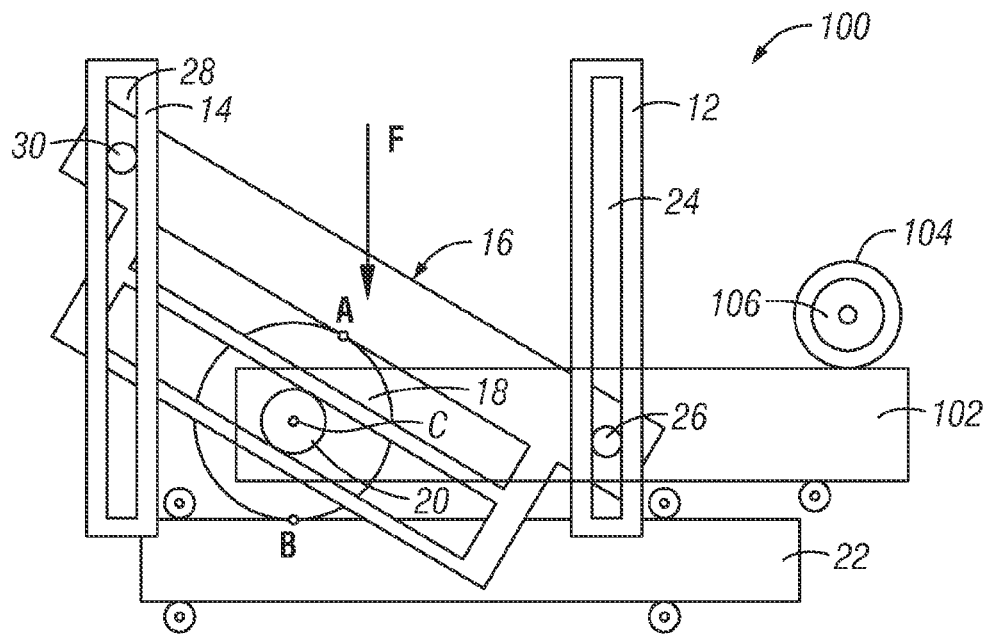
FIG. 8 is a front view of the transmission according to another embodiment of the present invention.

FIG. 8 shows two guideways 12, 14 which remain stationary during operation at a particular speed ratio. A first member 16 has two round protrusions 26, 30 that fit into the slots 24, 28 of the vertical guideways 12, 14. The first member 16 can be considered an input member, an output member, or a control member. As shown in FIG. 8, the first member 16 is considered to be an input member as the force, F, moves the first member 16 up and down at a prescribed input speed. The first member 16 has gear teeth that mesh with the teeth of gear 18, and gear 18 also meshes with gear teeth on the second member 22. As shown in FIG. 8, the second member is considered to be a control member. It is to be understood, however that the first member can be either an input member, or an output member, or a control member and the second member 22 can be either an input member, or an output member, or a control member. Furthermore, the member 102 can be the input member, and either member 16 or member 22 can then be the output member.

A member 102 is operably connected to a gear 18 at the gear's axis of rotation. The member 102 has gear teeth along its upper side that mesh with a gear 104 and is constrained to translate left to right as the gear 18 both rotates and translates. The gears 104 and 106 rotate about a common, fixed center, and the two gears are operably connected by a one-way clutch. When the gear 104 drives the other gear 106 in a counterclockwise direction, the two will rotate together and have the same rotational speed. When the gear 104 is rotating in a clockwise direction, the one-way clutch is disengaged, and the other gear 106 is allowed to "free-wheel" and may continue rotating in a counterclockwise direction. In this particular configuration, the gear 106 is the output member.

When the member 22 is used as the input (caused by imparting a left-to-right or right-to-left generally horizontal force on a member 22), the gear 18 is the initial output member. The member 16 is used as the control link, which changes the output and input speed ratio, depending on its angular orientation relative to member 22. Motion of the member 22 to the right will cause the gear 18 to translate to the right and to spin counter-clockwise. The member 102 will translate to the right as well, due to being operably connected to the gear 18. The output speed of the member 102 moving to the right will depend on the orientation of the control link 16, which is controlled by increasing or decreasing the separation between vertical guideways 12 and 14. The member 102 translating to the right will cause the gear 104 to rotate counterclockwise, which causes the gear 106 to also rotate counterclockwise together with the same rotational speed as the gear 104. Once the member 102 reaches its rightmost position, it will reverse direction and translate towards its leftmost position. Moving leftward will cause the gear 18 to translate to the left, and this pulls the member 102 to the left as well. The member 102 moving to the left will cause the gear 104 to rotate clockwise, but the gear 106 may continue rotating counterclockwise due to the one-way clutch connecting the gears.

Figure 9:
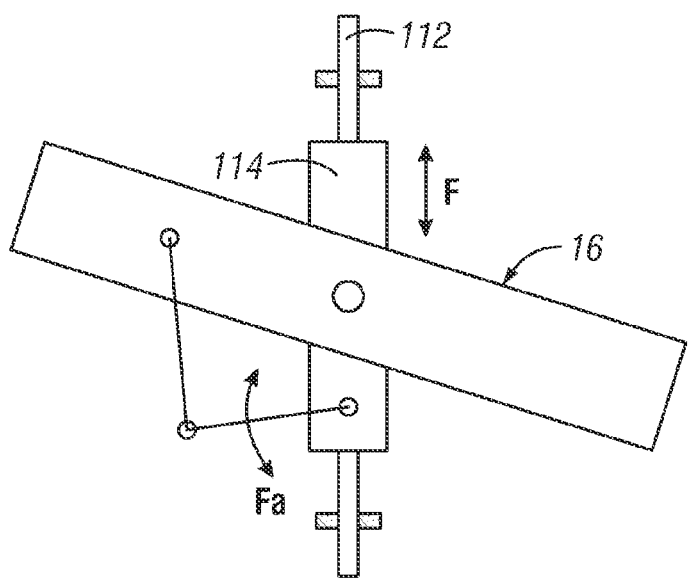
FIG. 9 is front view of another embodiment of an input mechanism to run the continuously variable transmission.

FIG. 9 shows an alternative method to change the angular orientation of the control link 16. The method includes a fixed rigid member 112, configured either horizontally or vertically as shown, and a linkage collar 114. The collar 114 is operably connected to a rotating crankshaft driven by a piston (both not shown). For example, rotational motion of a crank shaft may be converted to linear motion imparted to the collar 114 by operation of a slider-crank mechanism. The collar 114 is additionally connected to the control link 16 at a fixed point and is thereby slidably connected to the rigid member 112 by way of the collar 114. The control link 16 is then connected to the transmission system 100 as shown and described in FIG. 8.

The rotational motion of a crankshaft (not shown) would provide the input such as via a slider-crank arrangement, and would slide the collar 114 up and down along the rigid member 112. When a crankshaft providing the force F moves the collar 114 downward, the control link 16, will force the gear 18 to translate to the left, which would also cause the member 102 to move to the left as the gear 18 and member 102 are connected at the center of the gear at fixed point C. Member 22 would move in the left direction with member 102. The member 102 will cause the gear 104 to rotate clockwise. The gear 106 will not rotate clockwise with gear 104 due to the one-way clutch. When a crankshaft (not shown) completes its rotation, it will force the collar 114 upward. The upward movement causes the gear 18 to move to the right, which also causes the member 102 to translate to the right. The movement of the member 102 to the right causes the gear 104 to rotate in a counterclockwise direction. The corotation of the gear 104 would cause the gear 106 to rotate the same direction and at the same rotational speed for a final desired output. A force, Fa, imparted on the armature connected to both the control link 16 and collar 114 changes the orientation of the control link and thus the ratio of the output motion to the input motion of the transmission 100.

The present invention contemplates that the transmission could be used in an automotive application with the reciprocating translation of the pistons transferring motion to a continuously rotating crankshaft. The rotational motion of the crankshaft could then (through a slider-crank arrangement) provide translating motion to multiple instances of the continuously variable speed transmission described herein. The multiple instances of the elements shown in FIG. 8 would be operating out of phase with each other so the ultimate output member 106 would be driven smoothly as the crankshaft makes one full revolution.

The present invention also contemplates that the transmission 100 could be integrated internally in an engine, with the reciprocating pistons directly providing the translation motion for the input members of multiple instances of the transmission. So, a four cylinder engine would have four instances of the transmission, all driving the same ultimate output member 106 in a smooth, continuously rotating motion, and a six cylinder engine would have six instances of the transmission positioned internally in the engine.

The present invention is not to be limited to the specific description provided herein. The present invention contemplates numerous variations including variations in types of parts, part sizes, the types of gears used such as spur or helical or otherwise, and the range of the angle between the input member and the output member. These and other variations fall within the spirit and scope of the invention.

What is claimed is:

1. A continuously variable speed transmission, comprising:
   a first guideway;
   a second guideway;
   wherein the first guideway and the second guideway remain stationary during operation at a particular speed ratio;
   a first member moveably connected to the first guideway and the second guideway, the first member further comprising gear teeth;
   a second member having gear teeth positioned at an adjustable angle relative to the first member;
   a first gear engagingly connected to the gear teeth of the first member and the gear teeth of the second member;
   a third member operably connected to the first gear and having gear teeth;
   a second gear engagingly connected to the gear teeth of the third member; and
   wherein the speed ratio of the transmission is determined based on angle of the second member relative to the first member.

2. The continuously variable speed transmission of claim 1 wherein the first guideway includes a first slot and the second guideway includes a second slot.

3. The continuously variable speed transmission of claim 2 wherein the first member comprises two protrusions, a first of the protrusions fitting within the first guideway and a second of the protrusions fitting within the second guideway.

4. The continuously variable speed transmission of claim 1 wherein the second gear comprises a gear set having a first spur gear engagingly connected to the gear teeth of the third member and a second spur gear rotatably connected to the first spur gear by a one-way clutch.

5. The continuously variable speed transmission of claim 4 wherein rotation of the first spur gear in one direction imparts rotation to the second spur gear in the same direction.

6. The continuously variable speed transmission of claim 1 wherein the angle of the second member relative to the first member being adjustable from 0 degrees to 90 degrees.

7. The continuously variable speed transmission of claim 1 further comprising a sliding collar assembly operatively connected to the first member to provide an input to the transmission.

8. The continuously variable speed transmission of claim 7 wherein the slider collar assembly comprises an armature operably connected to the collar and the first member to thereby adjust the angle between the first and second members.

9. The continuously variable speed transmission of claim 1 wherein movement of the first member in a direction imparts movement to the third member in the same direction.

10. The continuously variable speed transmission of claim 1 wherein the first member is an input member to thereby provide an increase in speed or the second member is an input member to thereby provide a decrease in speed.

11. The continuously variable speed transmission of claim 1 further comprising a plurality of output gears, with one of the plurality of output gears engaging the second member and the plurality of gears configured such that a second of the plurality of output gears produces output motion rotating continuously in one direction.

12. A geared continuously variable speed transmission comprising:
    first rack reciprocating in a vertical direction;
    a second and third output rack constrained to transmit motion in only a horizontal direction;
    a gear engagingly connected to the first rack and both the second and third racks; and
    wherein an angle of the second rack relative to the first rack being adjustable over a range to thereby achieve an infinite number of speed ratios.

13. The geared continuously variable speed transmission of claim 12 further comprising a twin gear arrangement having first and second gears, the first gear engagingly connected to the third rack.

14. The geared continuously variable speed transmission of claim 13 wherein the second gear has a rotational output different from the first gear of the twin gear arrangement when the third rack moves in one direction.

15. The geared continuously variable speed transmission of claim 14 wherein the rotational output of the second gear is the same as the first gear of the twin gear arrangement when the second and third racks move in an opposite direction.

16. The geared continuously variable speed transmission of claim 12 further comprising a sliding collar assembly operatively connected to the first rack to provide an input to the transmission and having an armature operably connected to the collar and the first rack to thereby adjust the angle between the second and third racks.

17. The geared continuously variable speed transmission of claim 12 wherein the first rack comprises an input rack and the second and third racks comprise output racks.

18. The geared continuously variable speed transmission of claim 12 wherein the second rack comprises an input rack and the first and third racks comprise output racks.

19. A geared continuously variable speed transmission, comprising:
    a first guideway;
    a second guideway;
    wherein the first guideway and the second guideway remain stationary during operation at a particular speed ratio;
    a first member having gear teeth, the first member moveably connected to the first guideway and the second guideway;
    a second member having gear teeth, the second member positioned at an adjustable angle relative to the first member;
    a third member having gear teeth;

a first gear engagingly connected to the gear teeth of the first member and the gear teeth of the second member;

a second gear engagingly connected to the gear teeth of the third member; and wherein the speed ratio of the transmission is determined based on angle of the second member relative to the first member.

20. The geared continuously variable speed transmission of claim 19 further comprising a twin gear arrangement engagingly connected to the gear teeth of the third member.

21. The geared continuously variable speed transmission of claim 20 wherein the twin gear arrangement comprises one gear having a rotational output different from the other gear.

22. The geared continuously variable speed transmission of claim 19 further comprising a sliding collar assembly operatively connected to the first member to provide an input to the transmission, the sliding collar assembly having an armature operably connected to the collar and the first member to thereby adjust the angle between the first member and both the second and third members.

23. The geared continuously variable speed transmission of claim 19 wherein the first member is an input member and the second and third members are output members.

24. The geared continuously variable speed transmission of claim 19 wherein the second member is an input member and the first and third members are output members.

* * * * *